Jan. 30, 1951 W. J. NEISINGH 2,539,921
TOOL ACTUATING UNIT
Filed June 7, 1947 2 Sheets-Sheet 1
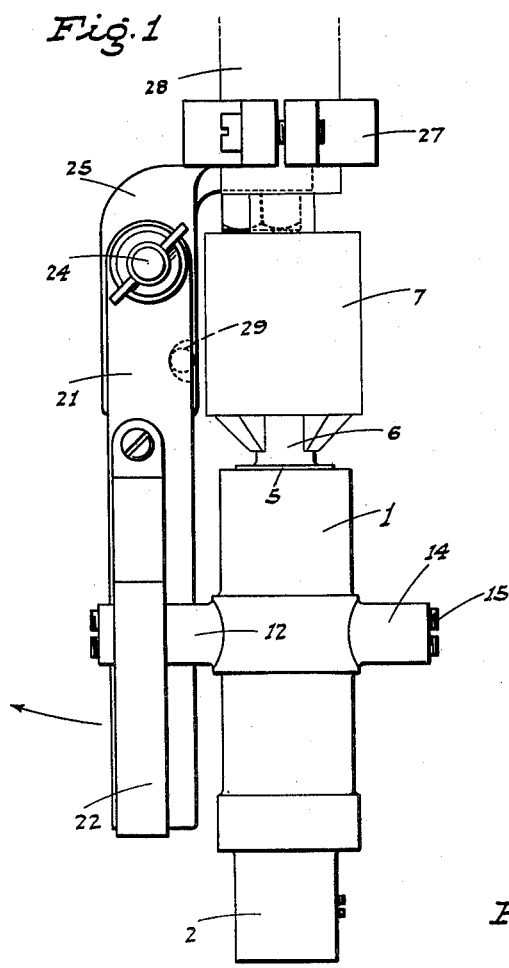
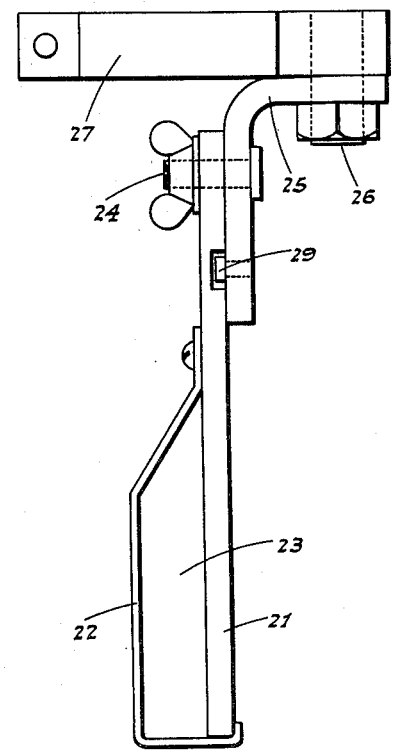
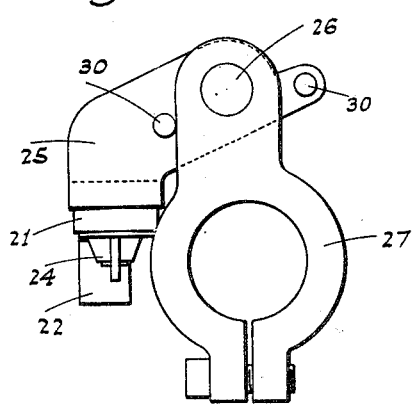
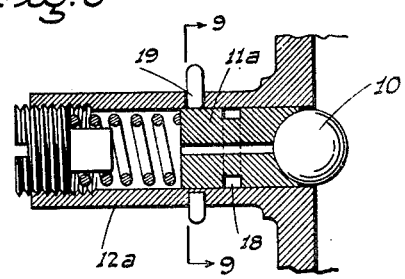
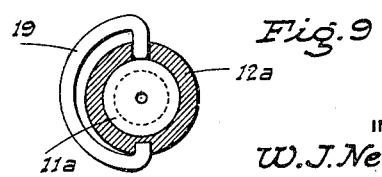
INVENTOR
W. J. Neisingh
BY
ATTORNEYS Jan. 30, 1951  W. J. NEISINGH  2,539,921
TOOL ACTUATING UNIT
Filed June 7, 1947  2 Sheets-Sheet 2
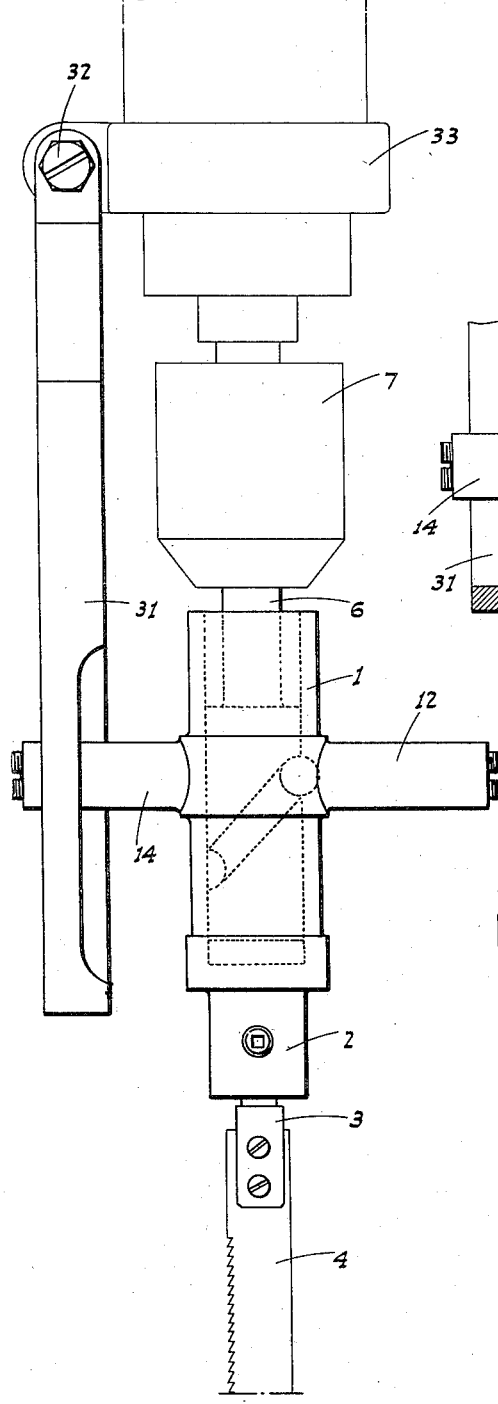
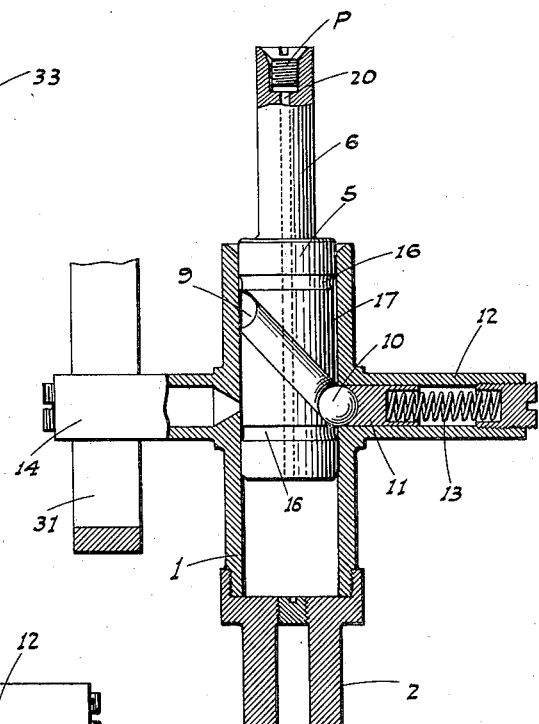
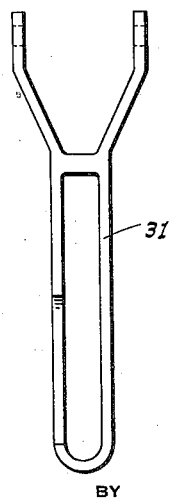
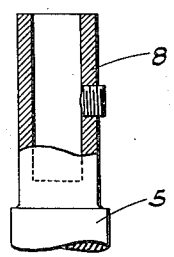
INVENTOR
W. J. Neisingh
BY
ATTORNEYS Patented Jan. 30, 1951

2,539,921

UNITED STATES PATENT OFFICE 2,539,921

TOOL ACTUATING UNIT

Walter J. Neisingh, Fresno, Calif.

Application June 7, 1947, Serial No. 753,170

6 Claims. (Cl. 74—57)

This invention relates to machine tools and particularly to a tool actuating unit adapted to be connected to and interposed between a rotary drive shaft (such as that of a drill press) and a tool such as a saw, file or knife.

The major object of my invention is to provide a unit of this general character by means of which the rotary motion of the shaft will impart a reciprocating motion to the tool through a stroke of definite length.

The unit includes a rotary member and a body in which said member is turnable and slidable and to which the tool is attached; and another object of this invention is to provide a means to normally hold the body from rotation but which can be manually released when desired, and which will be automatically released when an excessive load is placed on the tool so as to prevent damage being done to the tool and unit.

The unit also includes a circumferential diagonally cut groove in the rotary member and a ball radially slidable in the body and normally engaging the groove in driving relation. Under excessive load conditions the ball may be forced radially out from the groove clear of the same; and another object of the invention is to provide automatically functioning means to then releasably hold the ball from again advancing until manually released, and thus preventing possible damage to the ball and working face of the rotary member.

For certain types of work it is desirable to utilize the unit without definitely holding the body from rotation, this being governed by the engagement of the tool with the work itself. In connection with this feature I have provided means in the unit to enable the resistance to relative rotation and reciprocation of the body and rotary member to be changed as conditions may require for best results.

A further object of the invention is to produce a practical device and one which will be exceedingly effective for the purpose for which it is designed.

These objects are accomplished by means of such structure and relative arrangement of parts as will fully appear by a perusal of the following specification and claims.

In the drawings:

Figure 1 is a side elevation of the actuating unit as mounted in connection with a certain form of releasable guide device.

Figure 2 is a front elevation of said guide device detached.

Figure 3 is a plan view of the same.

Figure 4 is a side elevation of the actuating unit as mounted in connection with a modified form of guide.

Figure 5 is a sectional elevation of the actuating unit shown at the top stroke position.

Figure 6 is a front view of the latter form of guide detached.

Figure 7 is a fragmentary view showing a modified form of rotor shank.

Figure 8 is a fragmentary enlarged section showing the automatic ball lock-out device.

Figure 9 is a cross section of line 9—9 of Figure 8.

Referring now more particularly to the characters of reference on the drawings, the actuating unit, as here shown, comprises a cylindrical body 1 open at its upper end and closed at its lower end. Depending from and detachably secured to the body is a socket 2 to removably receive the shank or holder 3 of a tool such as a hacksaw 4 or whatever form of tool may be desirable and for which the unit is adaptable.

Slidable and turnable in the body is a cylindrical rotor 5 having a shank 6 at its upper end for engagement in the chuck 7 of a drill press or the like. If desired, the shank may be in the form of a socket 8 for direct engagement with a rotating shaft such as that of an electric motor when it is desired to employ the unit for certain uses.

Cut about the rotor intermediate its ends is an endless diagonal groove 9 of slightly less than semi-circular extent in cross section and in which a ball 10 rides. The ball is engaged by a thrust bearing 11 slidable in a radial boss 12 on the body, the bearing and ball being urged radially inward of the body by an adjustable compression spring 13 in the boss. A similar hollow boss 14 having a removable plug 15 may project from the body on the side opposite the boss 12, said boss 14 communicating with the interior of the body and being adapted to contain a supply of lubricant, or to be used as a storage compartment for a spare ball and spring.

Annular shallow ball-seating grooves 16 are cut in the rotor at the top and bottom of the groove 9, in which the ball may ride when thrown out of the groove 9 by an excessive load or axial movement of the body at the top and bottom of the normal stroke thereof. The rotor is relieved in diameter between the grooves 16, as shown at 17, to provide for better entry of the lubricant to the grooves and the working face of the body and to lessen the expense of manufacture of the rotor.

It sometimes occurs that a throw-out or retractive movement of the ball from groove 9 takes place between extremes of the latter under very heavy load so that the ball tends to ride against the smooth surface of the rotor before the machine can be stopped—a situation that is detrimental to the life of the unit. To remedy this, a ball riding device shown in Figs. 8 and 9 may be used. In this device the ball thrust bearing 11a sliding in the boss 12d is provided with an annular groove 18 intermediate its ends. A spring detent 19 is mounted in said boss radially out from the normal position of groove 18 a distance equal to the radius of ball 10, the detent normally riding on the peripheral face of bearing 11a. As the ball is retracted to its fullest extent by an overload in the rotor, the detent snaps into the groove 18 relieving the spring pressure on the ball and preventing the latter from pressing against the rotor until the ball is re-set or allowed to advance to its normal position by manually disengaging the detent from the bearing groove.

The rotor has an axial passage 20 from its lower end through the shank 6 to provide a breather, the upper end of said passage being provided with a plug P to keep dirt out when shipping or storing the unit. The plug, however, may be left in the rotor if it is adjustable, as shown in Fig. 5, to permit a certain controlled flow of air into and out of the passage for the purpose which will be seen later.

Since the actuating unit is mainly used to translate rotary movement of the rotor to reciprocating movement of the body, it is necessary to then hold the latter against undesired rotation. This is done by a releasable guide arrangement such as that shown in Figs. 1, 2 and 3. This guide comprises a depending arm 21 preferably disposed behind the unit and so that one face thereof is parallel to the adjacent side of either boss 12 or 14. A strap 22 is connected to the arm 21 and is shaped to form a boss riding slot 23 therewith. This strap is narrower than the arm in a direction radially of the unit so that the boss, if said unit is turning free, will engage the arm to aline itself with the slot before engaging the strap to thus facilitate entry of the boss into the slot. The arm is pivitally clamped, as at 24, for swinging movement in a vertical plane on a bracket 25 which in turn is swively mounted on a laterally off-set vertical clamping pivot 26 disposed on end to one side of a collar 27 which is clamped about the spindle 28 of the drill press. A stop pin 29 on the bracket engages the arm 21 and limits downward swinging movement thereof, while other stop pins 30 on the bracket engage the collar and limit swinging movement of said arm toward and away from the unit.

With this device it will be seen that normally the body 1 is held for vertical guided movement for the full length of its stroke as determined by the groove 9. If the use of the guide is not desired, the arm 21 may be swung up and clamped clear of the path of the bosses. For certain work, as when using saws, flat files and the like, the bracket 25 is clamped tight so that it cannot swing laterally, the relief for any overload being taken care of by the device of Fig. 8. Under other conditions, as when peening, punching, engraving, or the like, it is desirable that the bracket shall be yieldable or capable of swinging when a certain load on the tool is exceeded. In this case excessive pressure of the boss against the arm 21 swings the latter horizontally, and since the bracket on which the arm is mounted is pivoted eccentrically relative to the axis of the press and the actuating unit, said arm soon clears the path of the boss and the latter is released.

In Figs. 4 and 6 the guide is of a simpler form and comprises a unitary boss guiding arm 31 depending from a pivot connection 32 with the clamping collar 33 already present on certain drill presses. This guide can be swung up clear of the bosses but cannot swing about a vertical axis.

The actuating unit may also be used without the guide for certain work as for paint mixing. In this case the tool is in the form of a mixing element of paddle suspended from the body 1 and the extent of combined rotary and reciprocating movement of the body will depend on the drag of the paddle in the paint as will be evident. Such combined movement may also be effected by altering the compression and vacuum action within the body which is done by adjusting the vent plug P to alter the restriction of the flow of air into and out of the body. This drag within the unit may also be made use of in performing other work such as circle cutting, certain filing operations and the like.

While the unit has been here shown and described as being vertically disposed, it may also be used horizontally, as when chucked in a lathe or mounted on a horizontal motor shaft.

From the foregoing description it will be readily seen that there has been produced such a device as substantially fulfills the objects of the invention as set forth herein.

While this specification sets forth in detail the present and preferred construction of the device, in practice, such deviations from such detail may be resorted to as do not form a departure from the spirit of the invention, as defined by the appended claims.

Having thus described the invention, the following is claimed as new and useful and upon which Letters Patent is desired:

1. A tool actuating unit comprising a rotor adapted for connection with a rotary shaft to rotate therewith, a tool supporting body slidable on the rotor and in which the latter is turnable, means between the body and rotor to impart reciprocating movement to the body upon rotation of the rotor, guide means including a guide arm normally preventing rotation of the body and means mounting said arm for automatic movement to a release position when excessive rotative pressure is imparted to the body.

2. A tool actuating unit comprising a rotor adapted for connection with a rotary shaft to rotate therewith, a tool supporting body slidable on the rotor and in which the latter is turnable, means between the body and rotor to impart reciprocating movement to the body upon rotation of the rotor, a radial boss on the body, a longitudinally slotted guide arm in which the boss rides normally disposed parallel to the rotor and means mounting said arm for swinging movement to a position clear of the boss.

3. A tool actuating unit comprising a rotor adapted for connection with a rotary shaft to rotate therewith, a tool supporting body slidable on the rotor and in which the latter is turnable, means between the body and rotor to impart reciprocating movement to the body upon rotation of the rotor, a radial boss on the body, a longitudinally slotted guide arm in which the boss rides normally disposed parallel to the rotor, a bracket, a clamping pivot between the arm and bracket disposed at right angles to the axis of the plunger, a fixed collar, and a clamping pivot between the bracket and collar disposed parallel to but laterally offset from the axis of the rotor.

4. A tool actuating unit comprising a rotor adapted for connection with a rotary shaft to rotate therewith, a tool supporting body slidable on the rotor and in which the latter is turnable, the rotor having an endless diagonally cut groove therein, a ball mounted in the body and riding in the groove, and spring means yieldably urging the ball radially inward; relatively shallow, annular ball seating grooves cut therein adjacent but beyond the opposed portions of the first named groove.

5. A tool actuating unit comprising a rotor adapted for connection with a rotary shaft to rotate therewith, a tool supporting body slidable on the rotor and in which the latter is turnable, the rotor having an endless diagonally cut groove therein, a ball mounted in the body and riding in the groove, spring means yieldably urging the ball radially inward arranged so that the ball may retract clear of the groove and releasable means automatically preventing functioning of said spring means when the ball is thus retracted.

6. A tool actuating unit comprising a rotor adapted for connection with a rotary shaft to rotate therewith, a tool supporting body slidable on the rotor and in which the latter is turnable, the rotor having an endless diagonally cut groove therein, a ball riding in the groove, a radial boss on the body axially alined with the ball, a bearing member slidably fitted in the boss and in which the adjacent portion of the ball is seated, an adjustable helical spring in the boss urging the member radially inward, and a spring pressed detent mounted on the boss and bearing against the periphery of the bearing member, the latter being provided with an annular groove positioned to receive the detent upon substantially full retraction of the ball from the plunger groove.

WALTER J. NEISINGH.

REFERENCES CITED

The following references are of record in the file of this patent:

UNITED STATES PATENTS

| Number | Name | Date |
|---|---|---|
| 478,793 | Glover | July 12, 1892 |
| 1,134,047 | Hunter | Mar. 30, 1915 |
| 1,233,858 | Farmer | July 17, 1917 |
| 1,622,159 | Linden et al. | Mar. 22, 1927 |
| 1,813,286 | Gewalt | July 7, 1931 |
| 1,866,529 | Farkas | July 12, 1932 |
| 1,985,901 | Liles | Jan. 1, 1935 |
| 2,121,831 | Simmons | June 28, 1938 |
| 2,361,821 | Crowe et al. | Oct. 31, 1944 |

FOREIGN PATENTS

| Number | Country | Date |
|---|---|---|
| 574,400 | Great Britain | Jan. 3, 1946 |